United States Patent [19]

Lemke

[11] 4,388,659
[45] Jun. 14, 1983

[54] TAPE RECORDER APPARATUS CAPABLE OF PLAYING BACK SELECTED INFORMATION WHILE RECORDING OTHER INFORMATION

[75] Inventor: James U. Lemke, Del Mar, Calif.

[73] Assignee: Eastman Kodak Company, Rochester, N.Y.

[21] Appl. No.: 241,331

[22] Filed: Mar. 6, 1981

[51] Int. Cl.³ .......................... G11B 15/06; G11B 5/78
[52] U.S. Cl. ...................................... 360/90; 360/74.4
[58] Field of Search ................. 360/90, 63, 72.2, 74.4, 360/71, 73, 74.1

[56] References Cited

U.S. PATENT DOCUMENTS

| | | | |
|---|---|---|---|
| 3,467,790 | 9/1969 | Bolick, Jr. .............................. | 360/90 |
| 3,805,287 | 4/1974 | Totino ................................... | 360/90 |
| 3,942,190 | 3/1976 | Detwiler ............................... | 360/90 |
| 4,007,491 | 2/1977 | Bolick, Jr. et al. ................ | 360/74.4 |
| 4,123,787 | 10/1978 | Leclerc Du Sablon .............. | 360/90 |

*Primary Examiner*—Alfred H. Eddleman
*Attorney, Agent, or Firm*—Robert F. Cody

[57] ABSTRACT

Apparatus is disclosed for recording information on a tape record medium, and for playing back previously recorded information therefrom without interrupting the recording operation.

5 Claims, 9 Drawing Figures

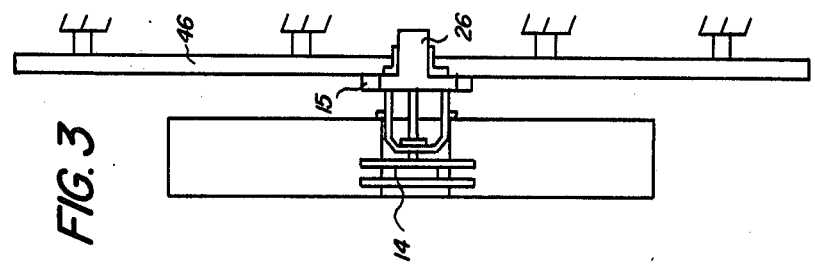
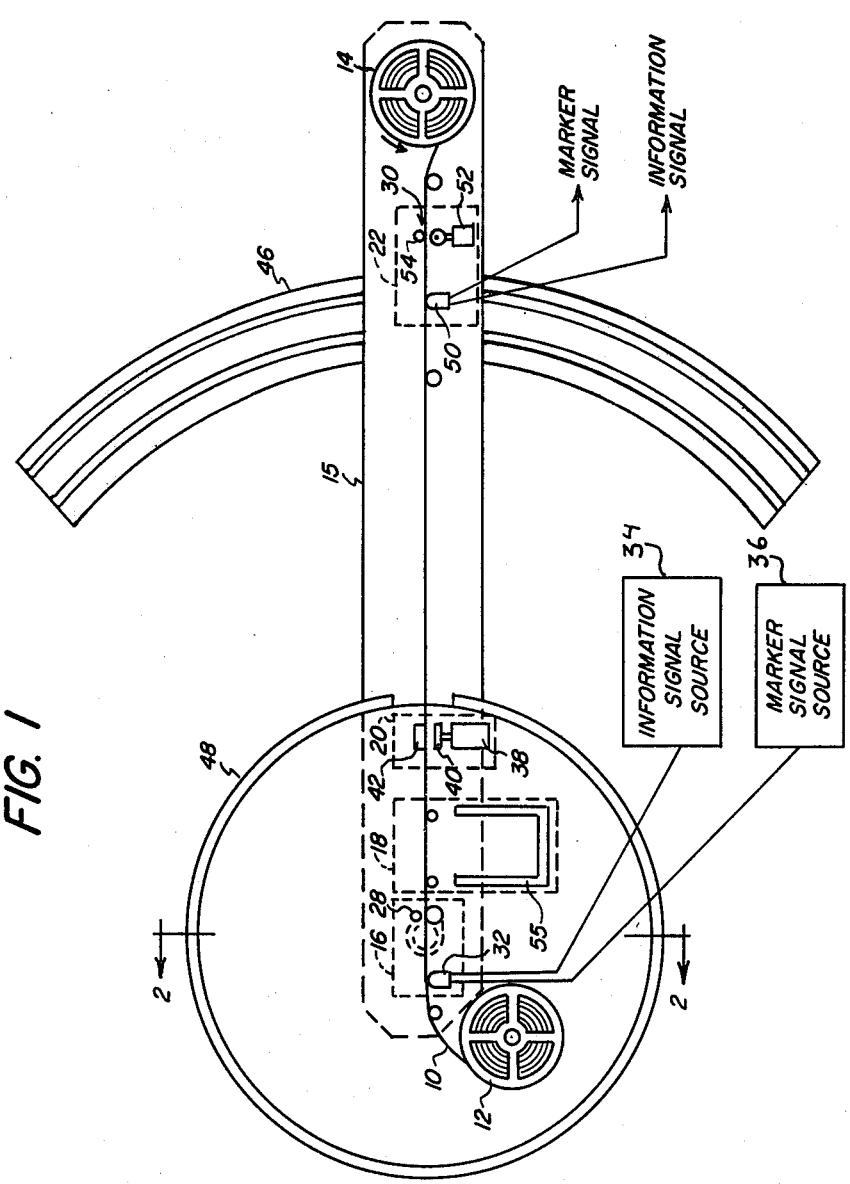

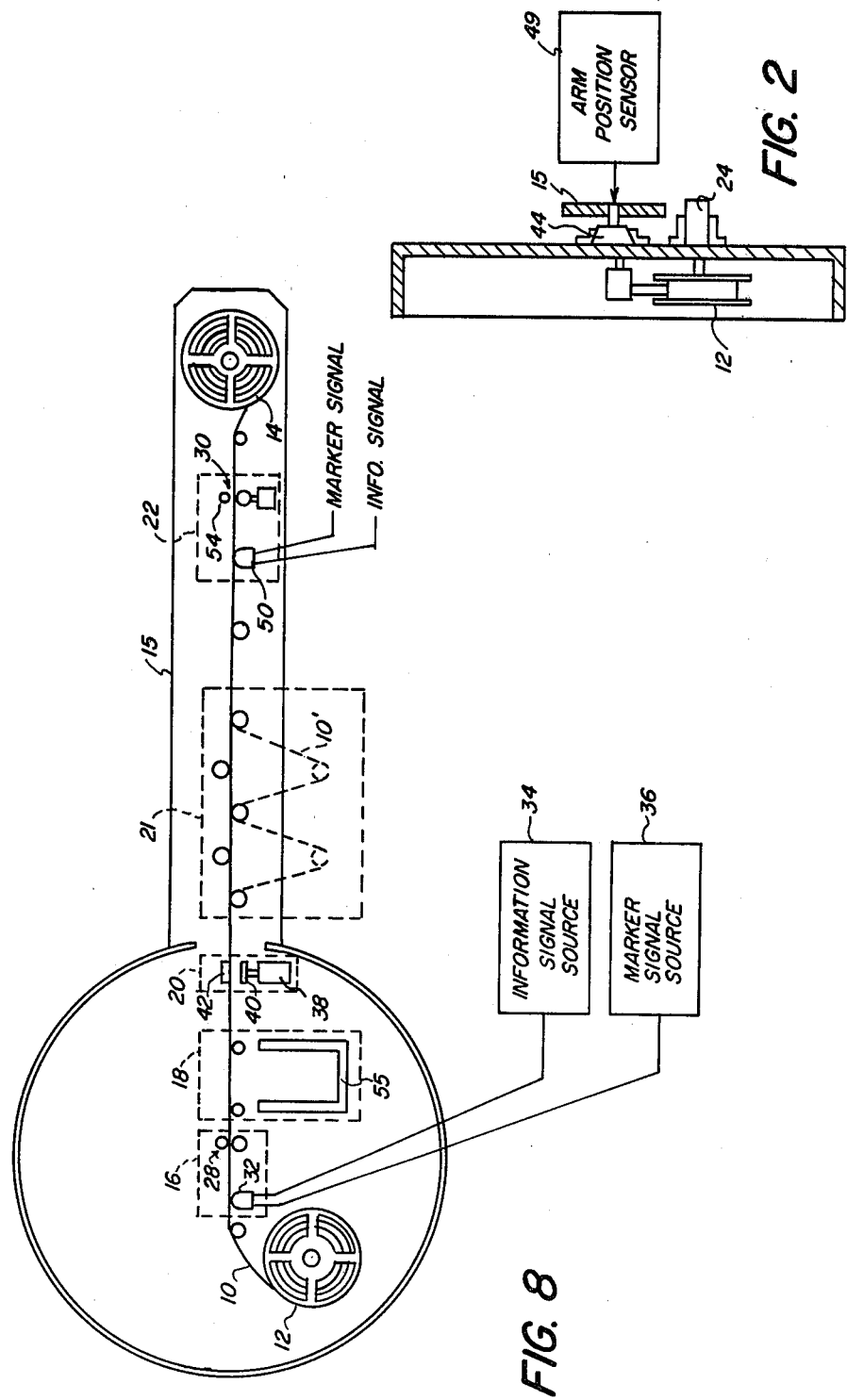

TAPE RECORDER APPARATUS CAPABLE OF PLAYING BACK SELECTED INFORMATION WHILE RECORDING OTHER INFORMATION

FIELD OF THE INVENTION

The present invention relates to apparatus for recording information on a tape record medium and for playing back information therefrom while recording continues.

DESCRIPTION RELATIVE TO THE PRIOR ART

In a typical magnetic tape recorder, magnetic tape from a supply reel is transported past a recording head and wound onto a take-up reel. An electrical signal applied to the recording head produced a magnetic field in the tape that varies in field strength in a manner that is representative of the information contained in the electrical signal. Such field strength variations result in the recording of signal information on the magnetic tape in the form of a remanent magnetization pattern. At the conclusion of recording, or at such time as it is desired to play back previously recorded information, the magnetic tape is rewound onto the supply reel; thereafter it is transported past a playback head which senses the remanent magnetization pattern and produces an output electrical signal in response thereto. In some recorders, the same head is used for both the recording and the playing back of information.

A recorder as described above is commonly used in applications such as logging incoming telephone calls to a police station. A problem arises, however, when it is desired to play back a previously recorded call because recording and playback cannot take place simultaneously. In this instance, one is faced with the choice of playing back a previously recorded call or continuing the recording of incoming calls. As a solution to this problem, it is common practice to use two (or more) recorders operating in tandem. Specifically, when it is desired to play back information recorded on one recorder, the second recorder takes over the recording function, thereby freeing the first recorder for use in playing back the desired information, and vice versa.

The use of two or more recorders in such applications, however, entails several disadvantages. For example, because the recording function is switched back and forth between recorders, a chronological information record is not produced on the tape record medium. Instead, the resulting information record is comprised of two (or more) tape reels which must be interlaced (by mechanical splicing or electronic dubbing) to provide a chronological information record. A further disadvantage is the requirement that a plurality of recorders are required, thereby increasing the cost and complexity of the recording system.

SUMMARY OF THE INVENTION

The present invention provides apparatus for recording information on a tape record medium and for playing back a selected segment of previously recorded information without interrupting the recording of information. In accordance with the invention, means are provided for reversing the direction of tape transportation through a playback station without affecting the direction of tape transportation through a recording station. The time is then determined at which a selected segment of previously recorded information is in position for playback, at which time the direction of tape transporation through the playback station is returned to the forward direction. As a result, the selected segment of previously recorded information is played back without interrupting the recording of information.

BRIEF DESCRIPTION OF THE DRAWINGS

In the detailed description of the preferred embodiments of the invention presented below, reference is made to the accompanying drawings, in which:

FIG. 1 is a plan view of recorder/playback apparatus in accordance with a first embodiment of the present invention;

FIG. 2 is a sectional view, taken along line 2—2, of the recorder/playback apparatus shown in FIG. 1;

FIG. 3 is an end view of the recorder/-playback apparatus shown in FIG. 1;

FIG. 8 is a plan view of recorder/playback apparatus in accordance with a second embodiment of the invention.

DETAILED DESCRIPTION OF THE PREFERRED EMBODIMENTS

Figure 4:
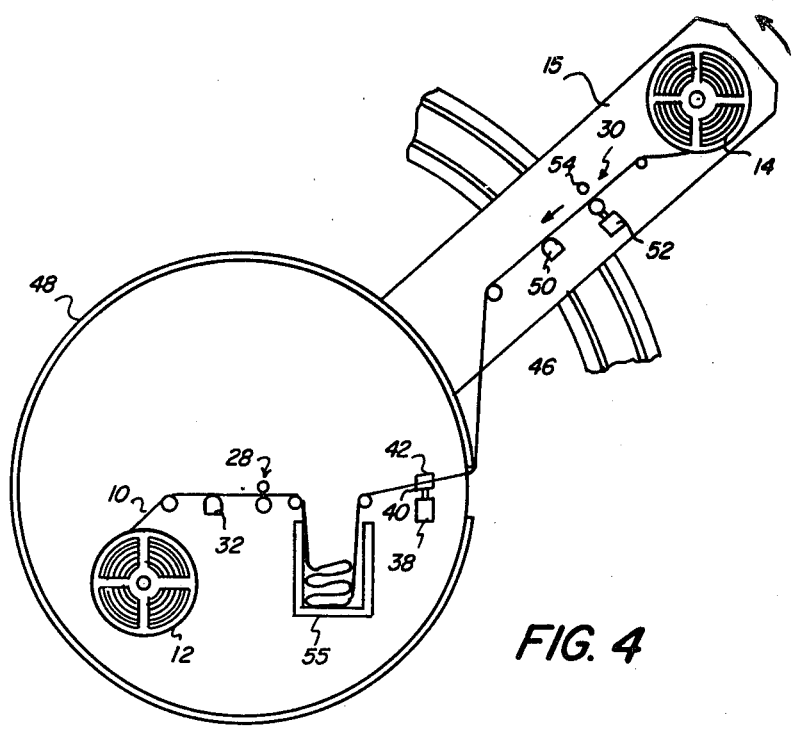
FIGS. 4 and 5 are plan view drawings useful in describing the operation of the recorder/playback apparatus shown in FIG. 1.

FIGS. 1, 2 and 3 depict recorder apparatus in accordance with a first embodiment of the present invention wherein previously recorded information can be played back without interrupting the recording operation. By way of overview, a tape record medium in the form of a magnetic tape 10 from a supply reel 12 is wound onto a take-up reel 14 that is mounted on an arm 15 that is rotatable by means of an arm motor 44 (see FIG. 2). The magnetic tape 10 passes through a recording station 16, a tape accumulator 18, a braking mechanism 20, and a playback station 22. Tape tension is controlled by a pair of torque motors 24 and 26 (see FIGS. 2 and 3) connected to the supply and take-up reels 12 and 14, respectively. As described in more detail below, tape speed through the recording station 16 is controlled by a capstan drive mechanism 28, while a variable speed capstan drive mechanism 30 controls tape speed through the playback station 22 during the playback operation.

In explaining the operation of the recorder/-playback apparatus shown in FIGS. 1, 2 and 3, it will be assumed, initially, that recording is to take place but that playback of recorded information is not desired. Magnetic tape 10 from the supply reel 12 is advanced by the capstan drive mechanism 28 past a recording head 32 which records an information signal from an information signal source 34. At the same time a marker signal from a marker signal source 36 is recorded which marks the location of information on the magnetic tape 10. It is assumed that the information signal and the marker signal are recorded on the magnetic tape 10 along respective tracks. It will be understood, however, that these signals could be combined on a single track or that either or both of these signals could occupy a plurality of tracks. After recording, the magnetic tape 10 is wound onto the take-up reel 14 after passing unimpeded through the tape accumulator 18, the braking mechanism 20 and the playback station 22.

Now assume that it is desired to play back a selected segment of the previously recorded information signal without interrupting the recording operation. The playback operation is initiated by energizing a solenoid 38 within the braking mechanism 20. Energization of the solenoid 38 causes a movable pad 40 to press the magnetic tape 10 against a stationary pad 42, thereby preventing further advancement of the tape 10 through the braking mechanism 20. In effect, the braking mechanism 20 serves to isolate tape tension between the recording station 16 and the playback station 22. The torque applied to the take-up reel 14 by the torque motor 26 is then reduced to a level just sufficient to prevent the magnetic tape 10 from "freely" unwinding from the take-up reel 14. Energization of the arm motor 44 (see FIG. 2) causes the arm 15 to rotate counterclockwise (when looking at FIG. 1), such rotational movement being facilitated by a stationary guide track 46. The position of the arm 15 shortly after rotational movement begins is as shown in FIG. 4, wherein it is seen that the magnetic tape 10 is in the process of being wound around the peripheral wall of a drum structure 48 as the tape 10 is pulled from the take-up reel 14. The result of winding the magnetic tape 10 around the drum structure 48 is to reverse the direction of tape transportation through the playback station 22.

Figure 5:
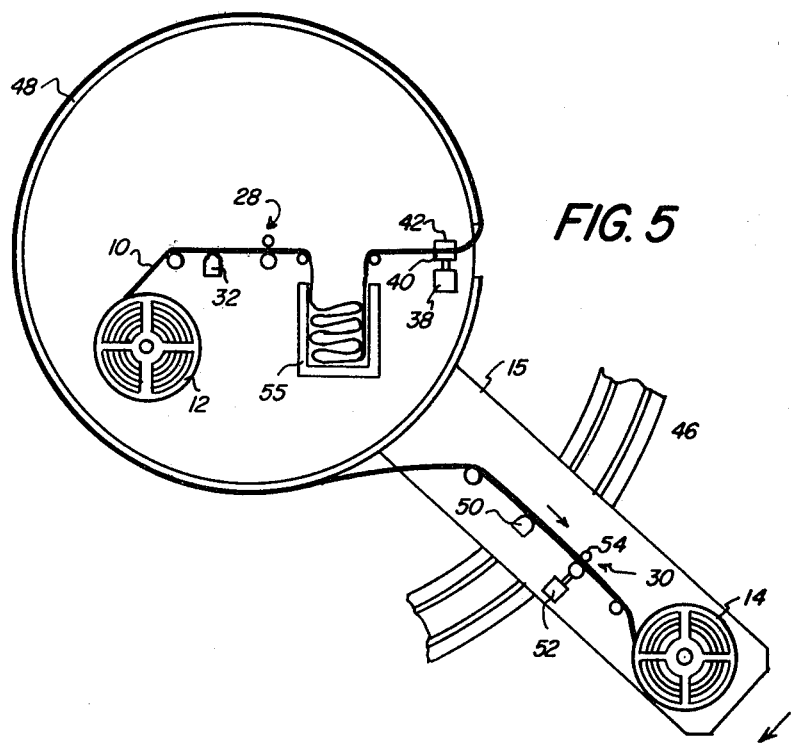

As the arm 15 continues its rotational motion, a playback head 50 plays back (in reverse) the marker signal that was previously recorded on the magnetic tape 10 by the recording head 32. The played back marker signal is applied to a system control unit (discussed in more detail below) which analyzes the marker signal to determine when enough tape has been unwound from the take-up reel 14 to commence playback of the selected segment of the previously recorded information signal. To begin playback, the arm motor 44 is de-energized, thereby stopping rotation of the arm 15. The torque applied to the take-up reel 14 by the torque motor 26 is brought up to a level suitable to provide proper tape tension for playback, and the capstan drive mechanism 30 is activated by energizing a solenoid 52 which presses the magnetic tape 10 against a capstan drive roller 54. Finally, as shown in FIG. 5, playback of the desired portions of the previously recorded information signal commences as the arm motor 44 causes the arm 15 to rotate in a clockwise direction, whereby magnetic tape 10 is unwound from the drum structure 48 and transported in the forward direction past the playback head 50 by the capstan drive mechanism 30.

After the selected segment of the previously recorded information signal has been played back, the magnetic tape 10 which remains wound about the drum structure 48 is rewound onto the take-up reel 14 by speeding the rate at which the arm 14 rotates in the clockwise direction while concomitantly increasing the speed of the capstan drive mechanism 30. When the magnetic tape 10 wrapped around the drum structure 48 has been rewound onto the take-up reel 14, and the arm 15 reaches its initial position (as sensed by an arm position sensor 49 shown in FIG. 2), the brake mechanism 20 is deactivated by de-energizing the solenoid 38. As a result, magnetic tape 10 which has accumulated in an accumulator bin 55 (see FIGS. 4 and 5) during the playback operation is quickly wound onto the take-up reel 14. To minimize the jolt experienced by the magnetic tape 10 as the last of the tape 10 is removed from the accumulator bin 55, the speed of the capstan drive mechanism 30 is gradually reduced so that at the end of the rewind operation the speed of the capstan drive mechanism 30 is equal to the speed of the capstan drive mechanism 28. The capstan drive mechanism 30 is then deactivated by de-energizing the solenoid 52, the torque applied to the take-up reel 14 by the torque motor 26 being returned to its original level. At this point, the recorder/playback apparatus has been returned to the state shown in FIG. 1.

Figure 6:
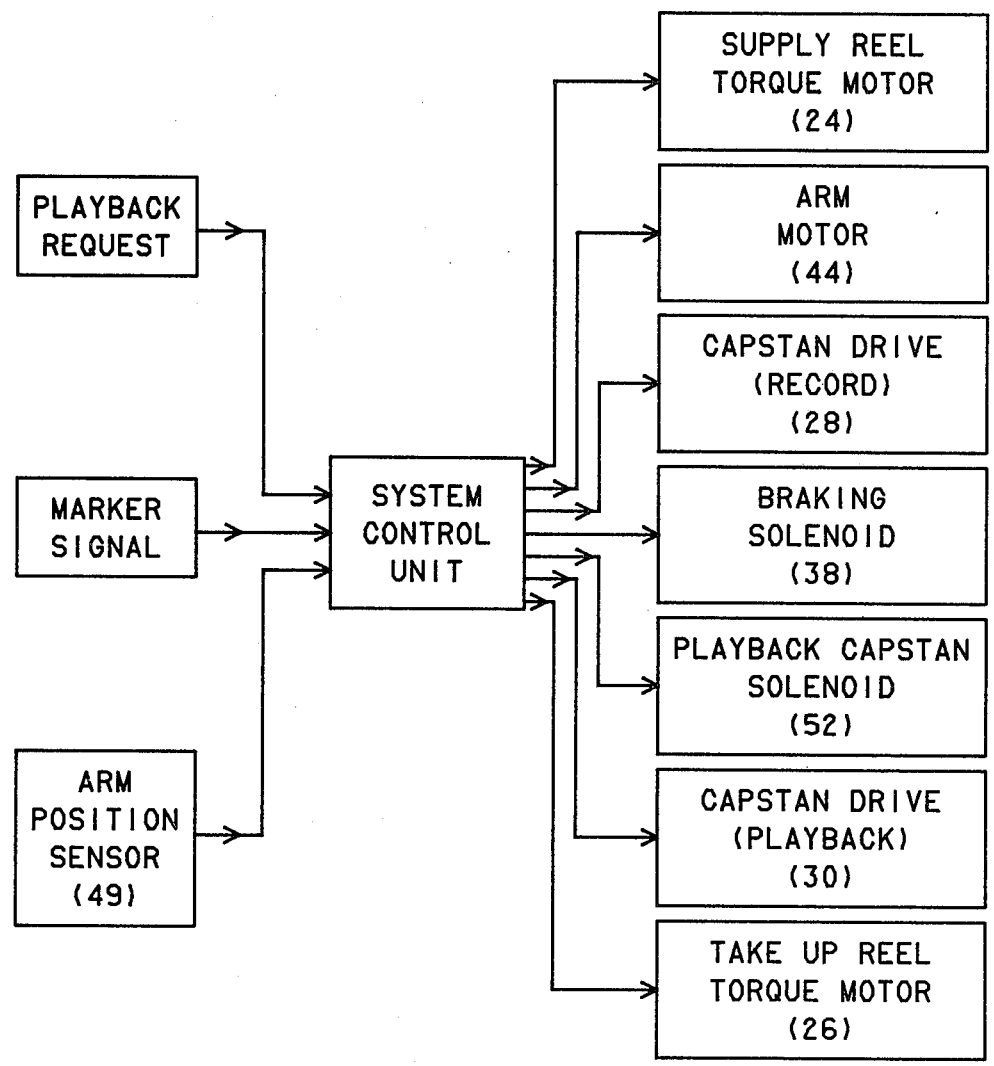
FIG. 6 is an electrical block schematic diagram illustrating the control circuitry of the recorder/playback apparatus shown in FIG. 1.
Figure 7A:
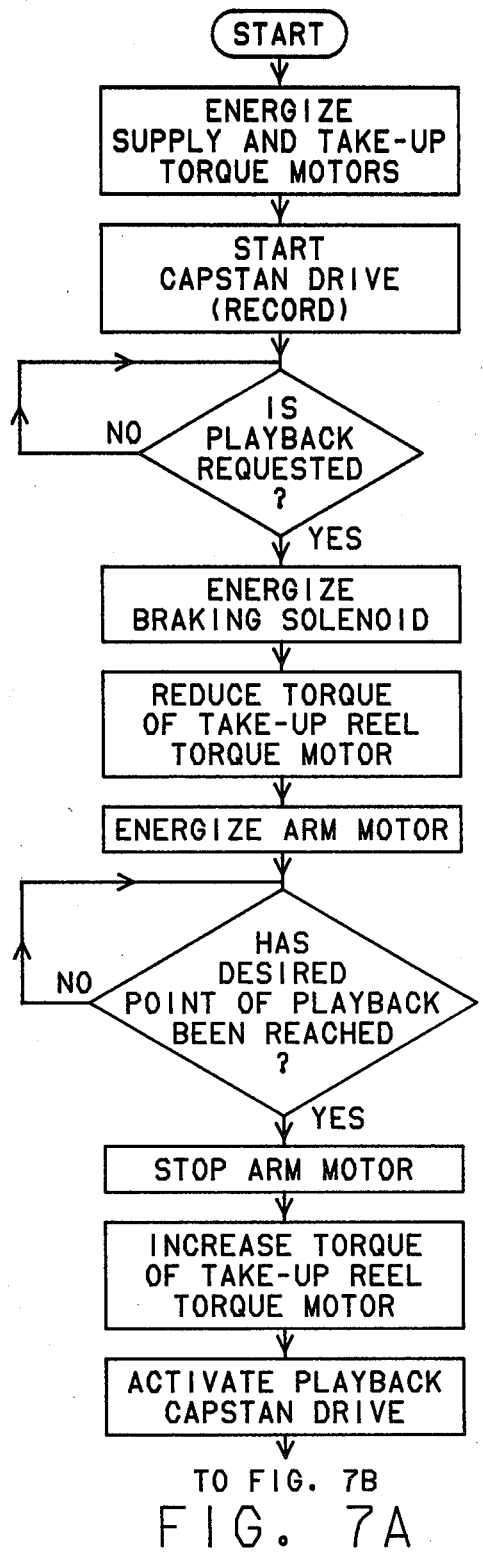
FIGS. 7A and 7B represent a flow chart showing the logic flow followed by the control circuitry shown in FIG. 6.
Figure 7B:
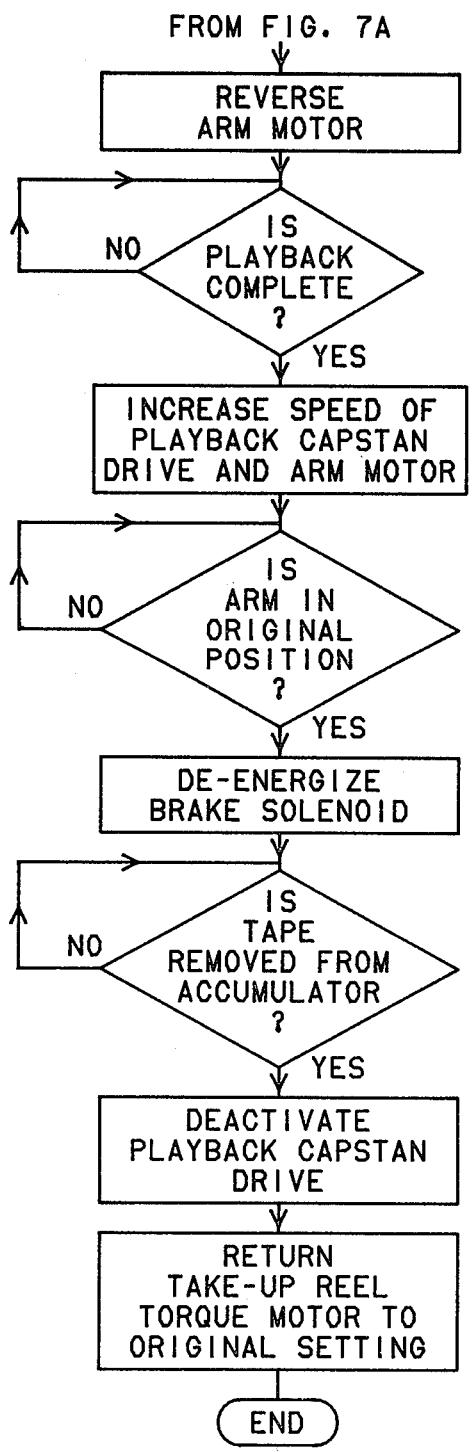

The circuitry for controlling the various functions described above is shown in block schematic form in FIG. 6. A system control unit receives a request to play back a selected segment of the previously recorded information signal (as identified by the marker signal). Based on this request and information from the played back marker signal and the signal output of the arm position sensor (49), the system control unit supplied output signals which control the operation of the supply and take-up reel torque motors (24, 26), the capstan drive mechanisms (28, 30), the arm motor (44), the playback capstan solenoid (52), and the braking mechanism solenoid (38). A flow chart showing the logic flow of the system control unit (and which summarizes the above-discussed functions) is shown in FIGS. 7A and 7B.

In accordance with a variation of the embodiment of the invention described above with reference to FIGS. 1 through 7B, the arm 15 is held stationary throughout the recording and playback operation while the drum structure 48 (and apparatus mounted thereto) is rotated to unwind magnetic tape 10 from the playback reel 14. In accordance with this variation, when the arm motor 44 is energized, its shaft, which is affixed to the arm 15, remains stationary while the housing of the motor 44 rotates, thereby producing the desired rotation of the drum structure 48. In other respects, the recording and playback operations are as described above.

FIG. 8 shows another embodiment of the invention wherein a loop accumulator 21 is provided on the arm 15 to unwind magnetic tape 10 from the take-up reel 14 during the playback operation. As a result, both the arm 15 and the drum structure 48 remain stationary throughout the recording and playback processes. Operation of the embodiment shown in FIG. 8 is similar to the operation of the embodiment shown in FIGS. 1 through 7B (compare FIGS. 1 and 8), with the exception that the loop accumulator 21 is energized instead of the arm motor 44. During recording with no playback requested, therefore, the path of the magnetic tape 10 is as shown in FIG. 8 by the solid line depiction of tape 10. During the playback operation, however, magnetic tape 10 is unwound from the take-up reel 14 by the loop accumulator 21, and the magnetic tape 10 assumes the path represented by the broken line 10'. In all other respects, the recording and playback operations proceed as previously discussed in connection with FIGS. 1 through 7B.

The invention has been described in detail with particular reference to certain preferred embodiments thereof, but it will be understood that variations and modifications can be effected within the spirit and scope of the invention. For example, it will be apparent to those skilled in the art that the drum structure need not be cylindrical in shape as shown in the Figures, but may assume other shapes depending upon the specific application.

What is claimed is:
1. Apparatus for recording information on a tape record medium and for reproducing the information recorded on a selected portion of the tape record medium without interrupting the recording of information, said apparatus comprising:

(a) a drum structure having a peripheral wall with an opening therein:

(b) means disposed within said drum structure for recording information on the tape record medium;

(c) means disposed outside said drum structure for playing back information peviously recorded on the tape record medium;

(d) means for feeding the tape record medium along a path which extends between said recording and reproducing means, and which tape path extends through said opening in the peripheral wall of said drum structure;

(e) means disposed in the tape path between said recording means and said opening in the peripheral wall of said drum structure for stopping the movement of a portion of the tape recording medium;

(f) means, operative in response to said tape stopping means for winding at least part of the tape record medium that extends from said tape stopping means to said reproducing means on said peripheral wall of said drum structure to bring the selected portion of the tape record medium into a position for playback by said playback means; and (g) means for unwinding the tape record medium from said drum structure to effect playback of the selected portion of the tape record medium.

2. Apparatus as claimed in claim 1 further comprising supply and take-up reeling means for said tape record medium disposed at opposing ends of said tape path, said supply reeling means being disposed within said drum.

3. Apparatus as claimed in claim 2 further comprising means disposed within said drum structure for accumulting the tape record medium as it leaves said recording means to enable recording on the tape record medium as the tape record medium is fed from said supply reeling means to said accumulating means.

4. Apparatus as claimed in claim 2 further comprising an arm structure mounted for rotation about an axis centered in said drum structure, said playback means and said take-up reeling means being mounted on said arm structure, and wherein said means for winding the tape record medium upon said drum structure includes means for rotating said arm structure in a given direction that unwinds the tape record medium from said take-up reeling means.

5. Apparatus as claimed in claim 4 wherein said means for unwinding the tape record medium from said drum structure comprises means for rotating said arm structure in a direction opposite to said given direction, whereby the tape record medium unwound from said take-up reeling means.

* * * * *